United States Patent
Moritomi et al.

(12)

(10) Patent No.: US 6,414,091 B2
(45) Date of Patent: Jul. 2, 2002

(54) THERMOPLASTIC RESIN, PROCESS FOR PRODUCING SAME AND THERMOPLASTIC RESIN COMPOSITION

(75) Inventors: Satoru Moritomi, Sodegaura; Masatoshi Iji, Tokyo, both of (JP)

(73) Assignees: Sumitomo Chemical Company, Limited, Osaka; NEC Corporation, Tokyo, both of (JP)

( * ) Notice: Subject to any disclaimer, the term of this patent is extended or adjusted under 35 U.S.C. 154(b) by 42 days.

(21) Appl. No.: 09/733,998

(22) Filed: Dec. 12, 2000

(30) Foreign Application Priority Data

Dec. 15, 1999 (JP) ............................................ 11-355756

(51) Int. Cl.[7] .............................................. C08G 77/46
(52) U.S. Cl. ........................ 525/474; 525/241; 525/390; 525/391; 525/393; 528/38; 528/43; 528/41; 528/25; 528/29; 568/608; 568/852
(58) Field of Search ................................ 525/476, 474, 525/241, 390, 391, 393; 528/38, 43, 41, 25, 29; 568/608, 852

(56) References Cited

U.S. PATENT DOCUMENTS

| 3,668,273 A | * | 6/1972 | Krantz | |
| 4,814,392 A | | 3/1989 | Shea et al. | .................. 525/391 |
| 5,281,686 A | * | 1/1994 | Blohm et al. | |
| 5,385,984 A | | 1/1995 | Blohm et al. | ............... 525/393 |

FOREIGN PATENT DOCUMENTS

EP          0 649 876 A1       4/1995

* cited by examiner

Primary Examiner—Robert Dawson
Assistant Examiner—Kuo Liang Peng
(74) Attorney, Agent, or Firm—Sughrue Mion, PLLC

(57) ABSTRACT

There are provided:
- (I) a thermoplastic resin (X-1) obtained by a process comprising the step of reacting:
  - (1) a polyphenylene ether resin (A) with
  - (2) a specific polyorganosiloxane (B),
- (II) a thermoplastic resin (X-2) obtained by a process comprising the step of reacting:
  - (1) a polyphenylene ether resin (A), with
  - (2) a specific polyorganosiloxane (B) and
  - (3) a coupling agent (C),
- (III) a process for producing the thermoplastic resin (X-1), which comprises the step of reacting:
  - (1) a polyphenylene ether resin (A) with
  - (2) a specific polyorganosiloxane (B),
- (IV) a process for producing the thermoplastic resin (X-2), which comprises the step of reacting:
  - (1) a polyphenylene ether resin (A) with
  - (2) a specific polyorganosiloxane (B) and
  - (3) a coupling agent (C), and
- (V) a thermoplastic resin composition (Z-1) comprising:
  - (i) the above-mentioned thermoplastic resin (X-1) or (X-2) and
  - (ii) a thermoplastic resin (D).

22 Claims, No Drawings

THERMOPLASTIC RESIN, PROCESS FOR PRODUCING SAME AND THERMOPLASTIC RESIN COMPOSITION

FIELD OF THE INVENTION

The present invention relates to a thermoplastic resin, a process for producing such a thermoplastic resin and a thermoplastic resin composition. More specifically, the present invention relates to (i) a thermoplastic resin capable of giving a thermoplastic resin composition, which composition can exhibit a superior flame resisting property and superior mechanical properties without use of any flame retardant such as a halogen-containing flame retardant and a phosphorus-containing flame retardant, (ii) a process for producing such a thermoplastic resin, and (iii) the above-mentioned thermoplastic resin composition.

BACKGROUND OF THE INVENTION

A kind of flame retardant such as a halogen-containing flame retardant, a phosphorus-containing flame retardant and a metal hydroxide flame retardant have been extensively used as a flame retardant in order to give a flame resisting property to a thermoplastic resin.

However, the flame retardant such as a halogen-containing flame retardant and a phosphorus-containing flame retardant may give undesirable influences to the environment. And the metal hydroxide flame retardant has a problem that said retardant has to be used in a large amount in order to give a sufficient flame resistance to a thermoplastic resin, and as a result, the resulting thermoplastic resin composition is remarkably deteriorated in its mechanical properties.

As a flame retardant different from those mentioned above, U.S. Pat. Nos. 5,169,887 and 5,294,655 disclose a certain kind of polyorganosiloxane compound. More specifically, U.S. Pat. No. 5,169,887 discloses a flame resisting composition comprising a polyphenylene ether resin and a liquid straight chain phenylsiloxane, and U.S. Pat. No. 5,294,655 discloses another flame resisting composition comprising a polyphenylene ether resin, a liquid straight chain phenylsiloxane and a block copolymer elastomer. Each of these references referred to above is incorporated herein by reference in its entiety.

Although the compositions disclosed in said U.S. Patents are superior in their flame resistance to that of the polyphenylene ether resin per se, it is difficult to say that said compositions have a satisfactory flame resistance.

SUMMARY OF THE INVENTION

Accordingly, it is an object of the present invention to provide a thermoplastic resin capable of giving a thermoplastic resin composition, which composition can exhibit a superior flame resisting property and superior mechanical properties without use of any flame retardant such as a halogen-containing flame retardant and a phosphorus-containing-flame retardant.

It is another object of the present invention to provide a process for producing said thermoplastic resin.

It is a further object of the present invention to provide a thermoplastic resin composition superior in its flame resisting property and its mechanical properties.

The present inventors have undertaken extensive studies to develop a flame retardant, which does not give undesirable influences to the environment, and which is capable of giving a superior flame resistance to a thermoplastic resin without remarkable detriment to the mechanical properties of the thermoplastic resin. As a result, it has been found that a thermoplastic resin obtained by a reaction between a polyphenylene ether resin and a specific polyorganosiloxane is a superior flame retardant capable of giving a superior flame resisting property. Thereby, the present invention has been obtained.

The present invention provides a thermoplastic resin (X-1) obtained by a process comprising the step of reacting:
(1) a polyphenylene ether resin (A) with
(2) a polyorganosiloxane (B),
wherein the polyorganosiloxane (B) comprises:
  (i) at least one functional group selected from the group consisting of amino, epoxy, hydroxyl, phenol, carboxyl, amide, methacryloyl, vinyl, alkoxy, carbonyl and imino groups, and
  (ii) respective structure units represented by the following formulas (I), (II) and (III), provided that a molar ratio of the structure unit (I) to the structure unit (II), namely structure unit (I)/structure unit (II), is from 0.1 to 10

$$R_1R_2SiO_{1.0} \qquad (I)$$

$$R_3SiO_{1.5} \qquad (II)$$

$$R_4R_5R_6SiO_{0.5} \qquad (III)$$

wherein $R_1$, $R_2$ and $R_3$ are independently of one another an alkyl group having 1 to 3 carbon atoms or an aryl group having 6 to 10 carbon atoms, and $R_4$, $R_5$ and $R_6$ are independently of one another an alkyl group having 1 to 6 carbon atoms, an aryl group having 6 to 12 carbon atoms, an alkoxy group having 1 to 6 carbon atoms or a hydroxyl group.

The present invention also provides a thermoplastic resin (X-2) obtained by a process comprising the step of reacting:
(1) a polyphenylene ether resin (A), with
(2) a polyorganosiloxane (B) and
(3) a coupling agent (C),
wherein the polyorganosiloxane (B) comprises:
  (i) at least one functional group selected from the group consisting of amino, epoxy, hydroxyl, phenol, carboxyl, amide, methacryloyl, vinyl, alkoxy, carbonyl and imino groups, and
  (ii) respective structure units represented by the above-defined formulas (I), (II) and (III), provided that a molar ratio of the structure unit (I) to the structure unit (II), namely structure unit (I)/structure unit (II), is from 0.1 to 10.

The present invention further provides a process for producing a thermoplastic resin (X-1), which comprises the step of reacting:
(1) a polyphenylene ether resin (A) with
(2) a polyorganosiloxane (B),
wherein the polyorganosiloxane (B) comprises:
  (i) at least one functional group selected from the group consisting of amino, epoxy, hydroxyl, phenol, carboxyl, amide, methacryloyl, vinyl, alkoxy, carbonyl and imino groups, and
  (ii) respective structure units represented by the above-defined formulas (I), (II) and (III), provided that a molar ratio of the structure unit (I) to the structure unit (II), namely structure unit (I)/structure unit (II), is from 0.1 to 10.

The present invention still further provides a process for producing a thermoplastic resin (X-2), which comprises the step of reacting:

(1) a polyphenylene ether resin (A) with
(2) a polyorganosiloxane (B) and
(3) a coupling agent (C), wherein the polyorganosiloxane (B) comprises:
(i) at least one functional group selected from the group consisting of amino, epoxy, hydroxyl, phenol, carboxyl, amide, methacryloyl, vinyl, alkoxy, carbonyl and imino groups, and
(ii) respective structure units represented by the above-defined formulas (I), (II) and (III), provided that a molar ratio of the structure unit (I) to the structure unit (II), namely structure unit (I)/structure unit (II), is from 0.1 to 10.

The present invention additionally provides a thermoplastic resin composition (Z-1) comprising:
(i) the above-defined thermoplastic resin (X-1) and
(ii) a thermoplastic resin (D).

The present invention still additionally provides a thermoplastic resin composition (Z-2) comprising:
(i) the above-defined thermoplastic resin (X-2) and
(ii) a thermoplastic resin (D).

In the present invention, the thermoplastic resin (X-1) and the thermoplastic resin (X-2) are hereinafter together referred to as "thermoplastic resin (X)", and the thermoplastic resin composition (Z-1) and the thermoplastic resin composition (Z-2) are also hereinafter together referred to as "thermoplastic resin composition (Z)".

DETAILED DESCRIPTION OF THE INVENTION

The "polyphenylene ether resin (A)" used in the present invention means a (co)polymer resin obtained by oxidatively polymerizing at least one phenol compound represented by the following formula (IV) with oxygen or an oxygen-containing gas with the aid of an oxidative coupling catalyst,

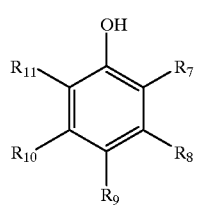

(IV)

wherein $R_7, R_8, R_9, R_{10}$ and $R_{11}$ are independently of one another a hydrogen atom, a halogen atom, a hydrocarbon group or a substituted hydrocarbon group, provided that at least one of them is always a hydrogen atom.

Examples of $R_7, R_8, R_9, R_{10}$ and $R_{11}$ in the formula (IV) are hydrogen, chlorine, bromine, fluorine, iodine, methyl, ethyl, n-propyl, iso-propyl, pri-butyl, sec-butyl, t-butyl, hydroxyethyl, phenylethyl, benzyl, hydroxymethyl, carboxyethyl, methoxycarbonylethyl, cyanoethyl, phenyl, methylphenyl, dimethylphenyl, ethylphenyl and allyl.

Examples of the phenol compound represented by the formula (IV) are phenol, o-cresol, m-cresol, p-cresol, 2,6-dimethylphenol, 2,5-dimethylphenol, 2,4-dimethylphenol, 3,5-dimethylphenol, 2-methyl-6-phenylphenol, 2,6-diphenylphenol, 2,6-diethylphenol, 2-methyl-6-ethylphenol, 2,3,5-trimethylphenol, 2,3,6-trimethylphenol, 2,4,6-trimethylphenol, 3-methyl-6-t-butylphenol, thymol and 2-methyl-6-allylphenol. Among these phenol compounds, 2,6-dimethylphenol, 2,6-diphenylphenol, 3-methyl-6-t-butylphenol and 2,3,6-trimethylphenol are preferred.

It is allowable to copolymerize the phenol compound represented by the formula (IV) with a polyhydric aromatic compound such as bisphenol-A, resorcinol, hydroquinone and novolak resins to prepare a copolymer. In the present invention, the polyphenylene ether resin (A) used in the present invention also means the copolymer obtained by such a copolymerization.

The oxidative coupling catalyst used for the oxidative (co)polymerization of said phenol compound is not particularly limited, and any catalyst having a polymerizing ability can be used.

As a process for oxidatively (co)polymerizing the phenol compound to produce the polyphenylene ether resin, there are exemplified those disclosed in, for example, U.S. Pat. Nos. 3,306,874, 3,306,875 and 3,257,357, Japanese Patent Publication (JP-B) No. 52-17880, Japanese Patent Kokai (JP-A) Nos. 50-51197 and 1-304119. Each of these references referred to above is incorporated herein by reference in its entiety.

Specific examples of the polyphenylene ether resin (A) used in the present invention are homopolymers such as poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-dibutyl-1,4-phenylene ether), poly(2,6-dipropenyl-1,4-phenylene ether), poly(2,6-dilauryl-1,4-phenylene ether), poly(2,6-diphenyl-1,4-phenylene ether), poly(2,6-dimethoxy-1,4-phenylene ether), poly(2,6-diethoxy-1,4-phenylene ether), poly(2-methoxy-6-ethoxy-1,4-phenylene ether), poly(2-ethyl-6-stearyloxy-1,4-phenylene ether), poly(2-methyl-6-phenyl-1,4-phenylene ether), poly(2-methyl-1,4-phenylene ether), poly(2-ethoxy-1,4-phenylene ether), poly(3-methyl-6-t-butyl-1,4-phenylene ether) and poly(2,6-dibenzyl-1,4-phenylene ether), and copolymers having repeating units which are different from one another and which are selected from those constituting the above-exemplified homopolymers.

The "polyphenylene ether resin (A)" used in the present invention further means a copolymer of a multi-substituted phenol such as 2,3,6-trimethylphenol and 2,3,5,6-tetramethylphenol with a 2-substituted phenol such as 2,6-dimethylphenol.

Among the polyphenylene ether resins exemplified above, preferred are poly(2,6-dimethyl-1,4-phenylene ether) and a copolymer of 2,6-dimethylphenol with 2,3,6-trimethylphenol.

The "polyphenylene ether resin (A)" used in the present invention still further means a graft copolymer obtained by grafting the above-mentioned (co)polymer with a styrene compound such as styrene, α-methylstyrene, p-methylstyrene and vinyltoluene.

The "polyphenylene ether resin (A)" used in the present invention additionally means a polyphenylene ether resin derivative capable of producing a chemical bond through reaction with the functional group contained in the polyorganosiloxane (B). Examples of the polyphenylene ether resin derivative are resins obtained by modification reaction of the polyphenylene ether resin such as poly(2,6-dimethyl-1,4-phenylene ether) with an acid anhydride such as maleic anhydride, resins obtained by modification reaction thereof with an epoxy compound such as glycidyl methacrylate, resins obtained by modification reaction thereof with a carboxylic acid such as acrylic acid and resins obtained by modification reaction thereof with an amine compound such as hexamethylenediamine.

The amino, epoxy, hydroxyl, phenol, carboxyl, amide, methacryloyl, vinyl, alkoxy, carbonyl or imino group contained in the polyorganosiloxane (B) used in the present invention is bonded to the terminal or the side chain of the polyorganosiloxane (B).

With respect to the structure units represented by the above formulas (I), (II) and (III), the structure units (I), (II) and (III) stand for a divalent structure unit expressing non-terminal parts (i.e. parts which are not terminal) of the molecule, a trivalent structure unit expressing non-terminal parts of the molecule, and a univalent structure unit expressing a terminal part of the molecule, respectively. Therefore, the structure unit of the formula (I) forms a straight chain structure, and the structure unit of the formula (II) forms a two- or three-dimensional network or branched structure.

Here, the term "structure unit" means a chemical structure unit constituting a compound. For example, a compound represented by the following formula (V) (its molecular formula being $C_{12}H_{36}Si_5O_4$) can be said to be a compound composed of one structure unit of $(CH_3)_2SiO_{1.0}$ (its molecular formula being $C_2H_6SiO_{1.0}$), one structure unit of $(CH_3)SiO_{1.5}$, and three structure units of $(CH_3)_3SiO_{0.5}$ (its molecular formula being $C_9H_{27}Si_3O_{1.5}$).

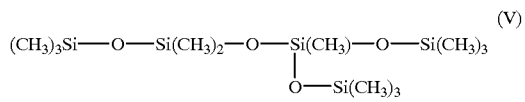

(V)

In the formulas (I) and (II), $R_1$, $R_2$ and $R_3$ are independently of one another an alkyl group having 1 to 3 carbon atoms or an aryl group having 6 to 10 carbon atoms. When $R_1$ to $R_3$ stand for the alkyl group, a methyl group is preferred. Examples of the aryl group are a phenyl group, a naphthyl group and groups derived from said groups. Among these aryl groups, a phenyl group is particularly preferred from a viewpoint of flame resistance of the thermoplastic resin composition in accordance with the present invention. Also from a viewpoint of flame resistance of the thermoplastic resin composition in accordance with the present invention, the aryl group is better than the alkyl group as $R_1$ to $R_3$. Here, when the polyorganosiloxane (B) has two or more structure units (I) ($R_1R_2SiO_{1.0}$), respective $R_1$s may be the same or different, and in the same way, respective $R_2$s may be the same or different.

In the formula (III), $R_4$, $R_5$ and $R_6$ are independently of one another an alkyl group having 1 to 6 carbon atoms, an aryl group having 6 to 12 carbon atoms, an alkoxy group having 1 to 6 carbon atoms or a hydroxyl group. From a viewpoint of balance between flame resistance and mechanical properties of the thermoplastic resin composition in accordance with the present invention, methyl and hydroxyl groups are preferred.

In the present invention, a proportion of aryl groups in groups represented by $R_1$ to $R_6$ is preferably from 10 to 100% by mole, and more preferably from 30 to 100% by mole, provided that the sum of groups represented by $R_1$ to $R_6$ is assigned to be 100% by mole. When the proportion of aryl groups is less than 10% by mole, the thermoplastic resin composition in accordance with the present invention may become insufficient in its flame resistance.

The polyorganosiloxane (B) used in the present invention can be produced in a manner known in the art to produce a polyorganosiloxane. As one embodiment of the production processes thereof, there can be exemplified a process comprising the steps of:

(1) subjecting a mixture of a diorganodichlorosilane and a monoorganotrichlorosilane to hydrolysis, thereby obtaining a precursor of the desired polyorganosiloxane, which is a partial condensation product of both chlorosilanes, and (2) allowing the precursor and a triorganochlorosilane to react with each other, wherein a chlorosilane having at least one functional group selected from the group consisting of amino, epoxy, hydroxyl, phenol, carboxyl, amide, methacryloyl, vinyl, alkoxy, carbonyl and imino groups is added in the step (1) and/or the step (2), whereby the polyorganosiloxane (B) can be produced.

A molar ratio of a content of the structure unit (I) in the polyorganosiloxane (B) to a content of the structure unit (II) therein, namely structure unit (I)/structure unit (II), is from 0.1 to 10. When the ratio exceeds 10, the thermoplastic resin composition (Z) in accordance with the present invention may become insufficient in its flame resistance. Whereas, when it is less than 0.1, a melt viscosity of the thermoplastic resin (X) may be increased to cause deterioration of a molding processability of the thermoplastic resin composition (Z).

In the present invention, the polyorganosiloxane (B) may further comprise a tetravalent structure unit represented by the following formula (VI) in addition to the divalent structure unit (I), the trivalent structure unit (II) and the univalent structure unit (III). A content of the structure unit (VI) is preferably not higher than 30% by mole based on the content of structure unit (II).

(VI)

A weight average molecular weight of the polyorganosiloxane (B) used in the present invention is preferably between 500 (inclusive) and 300,000 (exclusive). When the weight average molecular weight is lower than 500, the thermoplastic resin composition (Z) may be deteriorated in its flame resistance. On the other hand, when it is not lower than 300,000, the thermoplastic resin composition (Z) may be deteriorated in its moldability.

The "coupling agent (C)" used in the present invention means a compound capable of producing a chemical bond through reaction with both the polyphenylene ether resin (A) and the polyorganosiloxane (B). The coupling agent is not limited in its kind, and examples thereof are compounds having two or more functional groups such as amino, hydroxyl, carboxyl, epoxy and vinyl groups. Specific examples thereof are polyamine compounds such as 1,6-diaminohexane, 1,12-diaminododecane, triethyltetramine and diethylenetriamine; polyisocyanate compounds such as 2,4-tolylenediisocyanate, 2,6-tolylenediisocyanate, di-p-phenylenediisocyanate, phenylenemethanediisocyanate and triphenylenemethanetriisocyanate; polyol compounds such as 1,4-butanediol, 1,6-hexanediol, 1,12-dodecanediol, glycerol and pentaerythritol; polycarboxylic acids such as succinic acid, glutaric acid, adipic acid and phthalic acid; aminocarboxylic acids such as 6-aminohexanoic acid, 11-aminoundecanoic acid and 12-aminododecanoic acid; polyepoxy compounds such as ethylene glycol diglycidyl ether, propylene glycol diglycidyl ether, glycerol polyglycidyl ether, sorbitol polyglycidyl ether and trimethylolpropane polyglycidyl ether; and polyene compounds such as divinylbenzene, butadiene and hexadiene.

The coupling agent is used generally in an amount of from 0.3 to 4 times by molar equivalent the content (mole) of the functional group contained in the polyorganosiloxane (B).

A content of a chemical structure derived from the polyorganosiloxane (B) present in the flame resisting thermoplastic resin (X) in accordance with the present invention is usually from 10 to 90 parts by weight, and preferably from 20 to 80 parts by weight, based on 100 parts by weight of a chemical structure derived from the polyphenylene ether resin (A). When the content of the chemical structure derived from the polyorganosiloxane (B) is less than 10 parts by weight, the thermoplastic resin composition (Z) may become insufficient in its flame resistance. When it exceeds 90 parts by weight, the thermoplastic resin composition (Z) may become insufficient in its heat resistance.

The thermoplastic resin (X) in accordance with the present invention can be produced by the following production processes-1 to 4, which are only illustrative, and are not limitative for the scope of the present invention. Among these, the production processes-3 and 4 are preferred from an economical point of view.

Process-1

Process-1 comprises the step of heating a mixture containing the polyphenylene ether resin (A) and the polyorganosiloxane (B) in a substantially inert organic solvent. In the process, if desired, a peroxide may be used. Examples of the peroxide are benzoyl peroxide, t-butyl peroxybenzoate, dicumenyl peroxide, t-butylcumenyl peroxide, t-butyl peroxide, 2,5-dimethyl-2,5-di-t-butyl peroxyhexane, di-t-butylperoxy-di-isopropylbenzene and t-butyl peroxypivalate. As specific examples of the Process-1, there are enumerated the following processes (1) to (4):

(1) a process comprising the steps of:
  (i) dissolving poly(2,6-dimethyl-phenylene ether) and a polyorganosiloxane having a vinyl, hydroxyl or carboxyl group in toluene,
  (ii) heating the resulting solution at 50 to 111° C. for 0.1 to 1 hour,
  (iii) adding the peroxide thereto, (iv) refluxing the resultant for 24 hours, and then
  (v) recovering the desired thermoplastic resin (X) from the reaction mixture, (2) a process comprising the steps of:
  (i) dissolving an acid anhydride-modified resin of poly(2,6-dimethyl-1,4-phenylene ether) and an amino group-carrying polyorganosiloxane in toluene,
  (ii) refluxing the resulting solution for 0.1 to 10 hours, and then
  (iii) recovering the desired thermoplastic resin (X) from the reaction mixture, (3) a process comprising the steps of:
  (i) dissolving an epoxy group-carrying poly(2,6-dimethyl-1,4-phenylene ether) and an amino group or carboxyl group-carrying polyorganosiloxane in toluene,
  (ii) refluxing the resulting solution for 0.1 to 10 hours, and then
  (iii) recovering the desired thermoplastic resin (X) from the reaction mixture, and (4) a process comprising the steps of:
  (i) dissolving an amino group or carboxyl group-carrying poly(2,6-dimethyl-1,4-phenylene ether) and an epoxy group-carrying polyorganosiloxane in toluene,
  (ii) refluxing the resulting solution for 0.1 to 10 hours, and then
  (iii) recovering the desired thermoplastic resin (X) from the reaction mixture.

Process-2

Process-2 comprises the step of heating a mixture containing the polyphenylene ether resin (A), the polyorganosiloxane (B) and the coupling agent (C) in a substantially inert organic solvent. As a specific example of said Process-2, there is enumerated a process comprising the steps of:

(i) dissolving an acid anhydride-modified resin of poly(2,6-dimethyl-1,4-phenylene ether) and a carboxyl group-carrying polyorganosiloxane in toluene,
(ii) heating the resulting solution at 50 to 111° C. for 0.1 to 1 hour,
(iii) adding the diamine compound thereto,
(iv) refluxing the resultant for 1 to 24 hours, and then
(v) recovering the desired thermoplastic resin (X) from the reaction mixture.

The organic solvent used in this process and the above-mentioned Process-1 contains those capable of dissolving or dispersing the polyphenylene ether resin (A) and the polyorganosiloxane (B). Specific examples thereof are xylene and chloroform besides toluene already mentioned above.

Process-3

Process-3 comprises the step of melt-kneading a mixture containing the polyphenylene ether resin (A) and the polyorganosiloxane (B). As specific examples of the Process-3, there are enumerated the following processes (1) to (4):

(1) a process comprising the step of melt-kneading a mixture containing poly(2,6-dimethyl-1,4-phenylene ether) and a vinyl, hydroxyl or carboxyl group-carrying polyorganosiloxane to obtain the desired thermoplastic resin (X), (2) a process comprising the step of melt-kneading a mixture containing an acid anhydride-modified resin of poly(2,6-dimethyl-1,4-phenylene ether) and an amino group-carrying polyorganosiloxane to obtain the desired thermoplastic resin (X), (3) a process comprising the step of melt-kneading a mixture containing an epoxy group-carrying poly(2,6-dimethyl-1,4-phenylene ether) and an amino or carboxyl group-carrying polyorganosiloxane to obtain the desired thermoplastic resin (X), and (4) a process comprising the step of melt-kneading a mixture containing an amino or carboxyl group-carrying poly(2,6-dimethyl-1,4-phenylene ether) and an epoxy group-carrying polyorganosiloxane to obtain the desired thermoplastic resin (X).

Process-4

Process-4 comprises the step of melt-kneading a mixture containing the polyphenylene ether resin (A), the polyorganosiloxane (B) and the coupling agent (C). As a specific example thereof, there is enumerated a process comprising the step of melt-kneading a mixture containing an acid anhydride-modified resin of poly(2,6-dimethyl-1,4-phenylene ether), a carboxyl group-carrying polyorganosiloxane and the diamine compound to obtain the desired thermoplastic resin (X).

The thermoplastic resin (D) used in the present invention is not particularly limited. Specific examples thereof are alkenyl aromatic resins such as polystyrene, high impact polystyrene and styrene-butadiene-styrene triblock copolymer; polyphenylene ether resin; olefin polymers such as polypropylene, high density polyethylene, low density polyethylene, linear low density polyethylene, propylene-ethylene copolymer, ethylene-butene-1 copolymer, ethylene-pentene copolymer, ethylene-hexene copolymer and poly-4-methylpentene-1; copolymers of an olefin such as ethylene and propylene with a vinyl monomer such as an acrylic acid ester containing, for example, methyl acrylate and ethyl acrylate, a methacrylic acid ester containing, for example, methyl methacrylate and ethyl methacrylate, vinyl acetate, styrene, acrylonitrile and glycidyl (meth)acrylate; high molecular compounds such as polymethyl methacrylate, acrylonitrile-butadiene-styrene copolymer, polyvinyl acetate, polyvinylpyridine, polyvinylcarbazol, polyacrylamide, polyacrylonitrile, polycarbonate, polysulfone, polyether sulfone, polyethylene terephthalate, polybutylene terephthalate, polyarylene ester, polyphenylene sulfide, polyamide (for example, 6-nylon, 6,6-nylon and 12-nylon) and polyacetal; phenolic resin; silicone resin; and fluororesin. Among them, the thermoplastic resins (D) having an aromatic ring in the molecule is preferred, because such thermoplastic resins (D) have superior compatibility with the thermoplastic resin (X) in accordance with the present invention. Examples of the thermoplastic resin (D) having an aromatic ring in the molecule are polycarbonate, acrylonitrile-butadiene-styrene copolymer, alkenyl aromatic resin, polyphenylene ether resin and polyphenylene sulfide resin. Of these, the alkenyl aromatic resin and the polyphenylene ether resin are preferred, because said resins have particularly superior compatibility with the thermoplastic resin (X).

A proportion of the thermoplastic resin (X) in the thermoplastic resin composition (Z) in accordance with the present invention is usually from about 0.1 to about 20% by weight, provided that the sum of the thermoplastic resin (X) and the thermoplastic resin (D) is assigned to be 100% by weight. When the proportion of the thermoplastic resin (X) is less than about 0.1% by weight, the thermoplastic resin composition (Z) may become insufficient in its flame resistance. Whereas, when it exceeds about 20% by weight, the thermoplastic resin composition (Z) may be deteriorated in its mechanical properties such as rigidity.

If necessary, each one of the polyphenylene ether resin (A) and the polyorganosiloxane (B) used for the production of the thermoplastic resin (X) in accordance with the present invention, and each one of the thermoplastic resin (X) and the thermoplastic resin (D) used for the production of the thermoplastic resin composition (Z) in accordance with the present invention may be used in combination with an additional component. Examples of said additional component are styrene elastomers capable of improving properties such as processability and impact resistance of the thermoplastic resin composition (Z), and fillers capable of reinforcing the thermoplastic resin composition (Z) or giving some functions to the composition (Z) or increasing the weight of the composition (Z) in order to decrease its production cost.

The styrene elastomers mentioned above are not particularly limited, and those known in the art can be used. Specific examples thereof are a styrene-butadiene block copolymer having both at least one polystyrene block and at least one polybutadiene block; a styrene-isoprene block copolymer having both at least one polystyrene block and at least one polyisoprene block; a block copolymer having both at least one polystyrene block and at least one isoprene-butadiene copolymer block; another block copolymer obtained by selectively hydrogenating an unsaturated bond portion present in the isoprene block or the butadiene block of the above-mentioned block copolymers, which block copolymer is hereinafter referred to as "hydrogenated block copolymer"; and a graft copolymer obtained by graft-polymerizing styrene to a polyolefin elastomer obtained by copolymerizing at least two members selected from ethylene, propylene, butene, butadiene and isoprene, which graft copolymer is hereinafter referred to as "styrene-graft polyolefin". Of these, the hydrogenated block copolymer and the styrene-graft polyolefin are preferred.

The fillers mentioned above are not particularly limited. Specific examples thereof are reinforcing fibers such as glass fiber, carbon fiber, aramid fiber, aluminum-made fiber and stainless steel-made fiber; inorganic fillers such as metal whisker, silica, alumina, calcium carbonate, talc, mica, clay, kaolin, magnesium sulfate, carbon black, titanium oxide, zinc oxide and antimony trioxide; and additives such as antioxidants, weather resistance-improving agents, nucleating agents for polyolefin, slip agents, flame retardants, flame resisting auxiliaries, plasticizers, various coloring agents, anti-static agents and mold releasing agents.

A process for producing the thermoplastic resin composition (Z) in accordance with the present invention is not particularly limited, and may be any process known in the art. For example, there are enumerated (i) a process comprising the step of melt-kneading the thermoplastic resin (X) separately prepared with the thermoplastic resin (D) in a molten state, and (ii) a process comprising the step of blending the thermoplastic resin (X) separately prepared with the thermoplastic resin (D) in a solution state. Of these, the process (i) is recommendable. As one embodiment of the process (i), there is enumerated a process comprising the step of melt-kneading the thermoplastic resin (X) with the thermoplastic resin (D) with a kneading machine such as a Bumbury's mixer, a plastmill, a brabender, a single screw extruder and a twin screw extruder. A temperature for the melt-kneading is usually from 150 to 400° C., and preferably from 200 to 350° C.

In addition to the processes (i) and (ii) mentioned above, in which the thermoplastic resin (X) separately prepared is used, there is enumerated (iii) another process comprising the step of producing both the thermoplastic resin (X) and the thermoplastic resin composition (Z) successively or substantially simultaneously by melt-kneading method. The process (iii) is advantageous from an economical point of view. As one embodiment of the process (iii), there is enumerated a process comprising the step of either melt-kneading the polyphenylene ether resin (A), the polyorganosiloxane (B) and the thermoplastic resin (D) to obtain the thermoplastic resin composition (Z-1), or melt-kneading the polyphenylene ether resin (A), the polyorganosiloxane (B), the coupling agent (C) and the thermoplastic resin (D) to obtain the thermoplastic resin composition (Z-2), in an extruder equipped with the singular number or the plural number of a feeding means. A feeding order of respective components is not limited, and respective components may be fed in a lump or dividedly.

The thermoplastic resin composition (Z) in accordance with the present invention can be applied particularly suitably for uses where a flame resistance is required, for example, uses of electric and electronic parts such as flyback transducers, deflection yokes, connectors, relay housings and coil bobbins; uses of electric containers such as battery cases; and uses of structure parts such as developing tanks, fans, fan housings, housings of office automation instruments, chassis for office automation instruments and trays. A shape of the molded products is not limited.

In applying the thermoplastic resin composition (Z) in accordance with the present invention for uses as mentioned above, a method for molding said composition is not limited, and may be a conventional molding method. For example, an injection molding method, an extrusion molding method, a compression molding method and a blow molding method are enumerated.

EXAMPLE

The present invention is illustrated in more detail with reference to Examples, which are only illustrative, and are not limitative for the scope of the present invention. Meanings of abbreviated words and the evaluation method of flame resistance are as follows.

1. PPE

Poly(2,6-dimethyl-1,4-phenylene ether), its intrinsic viscosity measured in a chloroform solvent at 30° C. being 0.46 dl/g.

2. SIP-1

Polyorganosiloxane comprising the structure units (I), (II) and (III) mentioned above, and having a weight average molecular weight of 4,000, a vinyl group content of 1.2% by weight, a molar ratio of structure unit (I)/structure unit (II) of 0.25, and a molar ratio of methyl groups in groups represented by $R_1$ to $R_6$/phenyl groups therein of 1.

3. SIP-2

Polyorganosiloxane comprising the structure units (I), (II) and (III) mentioned above, and having a weight average molecular weight of 11,000, a hydroxyl group content of 0.9% by weight, a molar ratio of structure unit (I)/structure unit (II) of 1, and a molar ratio of methyl groups in groups represented by $R_1$ to $R_6$/phenyl groups therein of 0.5.

4. SIP-3

Silicon compound comprising the structure units (I) and (III) mentioned above, and having a weight average molecular weight of 11,000, a hydroxyl group content of 0.9% by weight, and methyl groups as all of groups represented by $R_1$ to $R_6$.

5. PO t-Butyl peroxypivalate of a trade mark PV-70, manufactured by Kayaku Nully Co., Ltd.

6. PS

Polystyrene resin of a trade mark G 690, manufactured by Japan Poly Styrene Inc.

7. Evaluation of Flame Resistance

The resin was press-molded at 300° C. to obtain a test piece of 50 mm length×5 mm width×1 mm thickness. The test piece was hung down to a clump vertically in a lengthwise direction. A flame was contacted with the lower end of the test piece. After 10 second contact, the flame was detached therefrom. A time from detachment of the flame to a time when a flame caused by burning of the test piece disappeared was measured. The time measured was regarded as a duration of combustion. The shorter the duration of combustion, the higher the flame resistance.

Example 1

4 Grams of PPE and 4 g of SIP-1 were dissolved in 100 cc of toluene in an eggplant type flask, which was then dipped in an oil bath kept at 130° C. To the solution, 100 mg of PO was added, and the mixture was refluxed for 2 hours. The resulting toluene solution was added to ethanol under stirring, thereby precipitating a solid, which was then separated by filtration. The solid separated was dissolved in toluene, the resulting toluene solution was added to ethanol under stirring, and a solid precipitated was separated by filtration, and this series of operations was repeated once more. The solid obtained was dried to obtain a thermoplastic resin (X-1).

With respect to the thermoplastic resin (X-1) obtained, an infrared spectroscopic analysis revealed absorption peaks caused by Si—$(CH_3)_{1-3}$ in the neighborhood of 800 cm$^{-1}$ and 1,240 cm$^{-1}$, respectively. From this fact, it was confirmed that the reaction between PPE and SIP1 proceeded. A glass transition point of the thermoplastic resin (X-1) was found to be 199° C. (DSC measurement). A duration of combustion relating to a test piece obtained by press-molding the thermoplastic resin (X-1) at 300° C. was found to be 2 seconds.

Example 2

Example 1 was repeated, except that SIP-2 was used in place of SIP-1, thereby obtaining another thermoplastic resin (X-1). An infrared spectroscopic analysis relating to the obtained thermoplastic resin (X-1) revealed absorption peaks caused by Si—$(CH_3)_{1-3}$ in the neighborhood of 800 cm$^{-1}$ and 1,240 cm$^{-1}$, respectively. From this fact, it was confirmed that the reaction between PPE and SIP-2 proceeded. A glass transition point of this thermoplastic resin (X-1) was found to be 191° C. (DSC measurement). A duration of combustion relating to a test piece obtained by press-molding this thermoplastic resin (X-1) at 300° C. was found to be 2 seconds.

Example 3

10 Parts by weight of the thermoplastic resin (X-1) obtained in Example 1 and 90 parts by weight of PPE were dissolved in chloroform. The chloroform solution was added to methanol under stirring, and a solid precipitated was separated by filtration and dried, thereby obtaining a thermoplastic resin composition (Z-1). A duration of combustion relating to a test piece obtained by press-molding the thermoplastic resin composition (Z-1) at 260° C. was found to be 1.3 seconds.

Example 4

10 Parts by weight of the thermoplastic resin (X-1) obtained in Example 1 and 90 parts by weight of PS were dissolved in chloroform. The chloroform solution was added to methanol under stirring, and a solid precipitated was separated by filtration and dried, thereby obtaining another thermoplastic resin composition (Z-1). A duration of combustion relating to a test piece obtained by press-molding this thermoplastic resin composition (Z-1) at 260° C. was found to be 23 seconds.

Comparative Example 1

Example 1 was repeated, except that SIP-3 was used in place of SIP-1, thereby obtaining a thermoplastic resin. An infrared spectroscopic analysis relating to this thermoplastic resin revealed absorption peaks caused by Si—$(CH_3)_{1-3}$ in the neighborhood of 800 cm$^{-1}$ and 1,240 cm$^{-1}$, respectively. From this fact, it was confirmed that the reaction between PPE and SIP-3 proceeded. A glass transition point of this thermoplastic resin was found to be 200° C. (DSC measurement). A duration of combustion relating to a test piece obtained by press-molding this thermoplastic resin at 300° C. was found to be 21 seconds.

Comparative Example 2

A duration of combustion relating to a test piece obtained by press-molding PPE at 300° C. was found to be 9 seconds.

Comparative Example 3

A duration of combustion relating to a test piece obtained by press-molding PS at 220° C. was found to be 63 seconds.

Comparative Example 4

10 Parts by weight of the thermoplastic resin obtained in Comparative Example 1 and 90 parts by weight of PPE were dissolved in chloroform. The chloroform solution was added to methanol under stirring, and a solid precipitated was separated by filtration and dried, thereby obtaining a thermoplastic resin composition. A duration of combustion relating to a test piece obtained by press-molding this thermoplastic resin composition at 300° C. was found to be 5.5 seconds.

Comparative Example 5

10 Parts by weight of the thermoplastic resin obtained in Comparative Example 1 and 90 parts by weight of PS were dissolved in chloroform. The chloroform solution was added to methanol under stirring, and a solid precipitated was separated by filtration and dried, thereby obtaining a thermoplastic resin composition. A duration of combustion relating to a test piece obtained by press-molding this thermoplastic resin composition at 260° C. was found to be 44 seconds.

What is claimed is:

1. A thermoplastic resin (X-1) obtained by a process comprising the step of reacting:
   (1) a polyphenylene ether resin (A) with
   (2) a polyorganosiloxane (B),
wherein the polyorganosiloxane (B) comprises:
   (i) at least one functional group selected from the group consisting of amino, epoxy, hydroxyl, phenol, carboxyl, amide, methacryloyl, vinyl, alkoxy, carbonyl and imino groups, and
   (ii) respective structure units represented by the following formulas (I), (II) and (III), provided that a molar ratio of the structure unit (I) to the structure unit (II), namely structure unit (I)/structure unit (II), is from 0.1 to 10

$$R_1R_2SiO_{1.0} \qquad (I)$$

$$R_3SiO_{1.5} \qquad (II)$$

$$R_4R_5R_6SiO_{0.5} \qquad (III)$$

wherein $R_1$, $R_2$ and $R_3$ are independently of one another an alkyl group having 1 to 3 carbon atoms or an aryl group having 6 to 10 carbon atoms, and $R_4$, $R_5$ and $R_6$ are independently of one another an alkyl group having 1 to 6 carbon atoms, an aryl group having 6 to 12 carbon atoms, an alkoxy group having 1 to 6 carbon atoms or a hydroxyl group.

2. The thermoplastic resin (X-1) according to claim 1, wherein a proportion of aryl groups in groups represented by $R_1$, $R_2$, $R_3$, $R_4$, $R_5$ and $R_6$ is from 10 to 100% by mole, provided that the sum of groups represented by $R_1$, $R_2$, $R_3$, $R_4$, $R_5$ and $R_6$ is assigned to be 100% by mole.

3. The thermoplastic resin (X-1) according to claim 1, wherein a weight ratio of the polyphenylene ether resin (A) to the polyorganosiloxane (B), namely ((A)/(B)), which are subjected to reaction, is from 10/90 to 90/10, provided that the sum of the polyphenylene ether resin (A) and the polyorganosiloxane (B) is assigned to be 100.

4. A thermoplastic resin (X-2) obtained by a process comprising the step of reacting:
   (1) a polyphenylene ether resin (A), with
   (2) a polyorganosiloxane (B) and
   (3) a coupling agent (C),
wherein the polyorganosiloxane (B) comprises:
   (i) at least one functional group selected from the group consisting of amino, epoxy, hydroxyl, phenol, carboxyl, amide, methacryloyl, vinyl, alkoxy, carbonyl and imino groups, and
   (ii) respective structure units represented by the following formulas (I), (II) and (III), provided that a molar ratio of the structure unit (I) to the structure unit (II), namely structure unit (I)/structure unit (II), is from 0.1 to 10

$$R_1R_2SiO_{1.0} \qquad (I)$$

$$R_3SiO_{1.5} \qquad (II)$$

$$R_4R_5R_6SiO_{0.5} \qquad (III)$$

wherein $R_1$, $R_2$ and $R_3$ are independently of one another an alkyl group having 1 to 3 carbon atoms or an aryl group having 6 to 10 carbon atoms, and $R_4$, $R_5$ and $R_6$ are independently of one another an alkyl group having 1 to 6 carbon atoms, an aryl group having 6 to 12 carbon atoms, an alkoxy group having 1 to 6 carbon atoms or a hydroxyl group.

5. The thermoplastic resin (X-2) according to claim 4, wherein a proportion of aryl groups in groups represented by $R_1$, $R_2$, $R_3$, $R_4$, $R_5$ and $R_6$ is from 10 to 100% by mole, provided that the sum of groups represented by $R_1$, $R_2$, $R_3$, $R_4$, $R_5$ and $R_6$ is assigned to be 100% by mole.

6. The thermoplastic resin (X-2) according to claim 4, wherein a weight ratio of the polyphenylene ether resin (A) to the polyorganosiloxane (B), namely ((A)/(B)), which are subjected to reaction, is from 10/90 to 90/10, provided that the sum of the polyphenylene ether resin (A) and the polyorganosiloxane (B) is assigned to be 100, and a proportion of the coupling agent (C) subjected to reaction is from 0.3 to 4 times by molar equivalent a content by mole of the functional group in the polyorganosiloxane (B).

7. A process for producing a thermoplastic resin (X-1), which comprises the step of reacting:
   (1) a polyphenylene ether resin (A) with
   (2) a polyorganosiloxane (B),
wherein the polyorganosiloxane (B) comprises:
   (i) at least one functional group selected from the group consisting of amino, epoxy, hydroxyl, phenol, carboxyl, amide, methacryloyl, vinyl, alkoxy, carbonyl and imino groups, and
   (ii) respective structure units represented by the following formulas (I), (II) and (III), provided that a molar ratio of the structure unit (I) to the structure unit (II), namely structure unit (I)/structure unit (II), is from 0.1 to 10

$$R_1R_2SiO_{1.0} \qquad (I)$$

$$R_3SiO_{1.5} \qquad (II)$$

$$R_4R_5R_6SiO_{0.5} \qquad (III)$$

wherein $R_1$, $R_2$ and $R_3$ are independently of one another an alkyl group having 1 to 3 carbon atoms or an aryl group having 6 to 10 carbon atoms, and $R_4$, $R_5$ and $R_6$ are independently of one another an alkyl group having 1 to 6 carbon atoms, an aryl group having 6 to 12 carbon atoms, an alkoxy group having 1 to 6 carbon atoms or a hydroxyl group.

8. The process for producing a thermoplastic resin (X-1) according to claim 7, wherein a proportion of aryl groups in groups represented by $R_1$, $R_2$, $R_3$, $R_4$, $R_5$ and $R_6$ is from 10 to 100% by mole, provided that the sum of groups represented by $R_1$, $R_2$, $R_3$, $R_4$, $R_5$ and $R_6$ is assigned to be 100% by mole.

9. The process for producing a thermoplastic resin (X-1) according to claim 7, wherein a weight ratio of the polyphenylene ether resin (A) to the polyorganosiloxane (B), namely ((A)/(B)), which are subjected to reaction is from 10/90 to 90/10, provided that the sum of the polyphenylene ether resin (A) and the polyorganosiloxane (B) is assigned to be 100.

10. A process for producing a thermoplastic resin (X-2), which comprises the step of reacting:
    (1) a polyphenylene ether resin (A) with
    (2) a polyorganosiloxane (B) and
    (3) a coupling agent (C), wherein the polyorganosiloxane (B) comprises:
(i) at least one functional group selected from the group consisting of amino, epoxy, hydroxyl, phenol, carboxyl, amide, methacryloyl, vinyl, alkoxy, carbonyl and imino groups, and
(ii) respective structure units represented by the following formulas (I), (II) and (III), provided that a molar ratio of the structure unit (I) to the structure unit (II), namely structure unit (I)/structure unit (II), is from 0.1 to 10

$$R_1R_2SiO_{1.0} \quad (I)$$

$$R_3SiO_{1.5} \quad (II)$$

$$R_4R_5R_6SiO_{0.5} \quad (III)$$

wherein $R_1$, $R_2$ and $R_3$ are independently of one another an alkyl group having 1 to 3 carbon atoms or an aryl group having 6 to 10 carbon atoms, and $R_4$, $R_5$ and $R_6$ are independently of one another an alkyl group having 1 to 6 carbon atoms, an aryl group having 6 to 12 carbon atoms, an alkoxy group having 1 to 6 carbon atoms or a hydroxyl group.

11. The process for producing a thermoplastic resin (X-2) according to claim 10, wherein a proportion of aryl groups in groups represented by $R_1$, $R_2$, $R_3$, $R_4$, $R_5$ and $R_6$ is from 10 to 100% by mole, provided that the sum of groups represented by $R_1$, $R_2$, $R_3$, $R_4$, $R_5$ and $R_6$ is assigned to be 100% by mole.

12. The process for producing a thermoplastic resin (X-2) according to claim 10, wherein a weight ratio of the polyphenylene ether resin (A) to the polyorganosiloxane (B), namely ((A)/(B)), which are subjected to reaction, is from 10/90 to 90/10, provided that the sum of the polyphenylene ether resin (A) and the polyorganosiloxane (B) is assigned to be 100, and a proportion of the coupling agent (C) subjected to reaction is from 0.3 to 4 times by molar equivalent a content by mole of the functional group in the polyorganosiloxane (B).

13. A thermoplastic resin composition (Z-1) comprising:
(I) the thermoplastic resin (X-1) according to claim 1 and
(II) a thermoplastic resin (D).

14. The thermoplastic resin composition (Z-1) according to claim 13, wherein the thermoplastic resin (D) contains a thermoplastic resin having an aromatic ring.

15. The thermoplastic resin composition (Z-1) according to claim 13, wherein the thermoplastic resin (D) contains a polyphenylene ether resin.

16. The thermoplastic resin composition (Z-1) according to claim 13, wherein the thermoplastic resin (D) contains an alkenyl aromatic resin.

17. The thermoplastic resin composition (Z-1) according to claim 13, wherein a proportion of the thermoplastic resin (X-1) is from about 0.1 to about 20% by weight, provided that the sum of the thermoplastic resin (X-1) and the thermoplastic resin (D) is assigned to be 100% by weight.

18. A thermoplastic resin composition (Z-2) comprising:
(I) the thermoplastic resin (X-2) according to claim 4 and
(II) a thermoplastic resin (D).

19. The thermoplastic resin composition (Z-2) according to claim 18, wherein the thermoplastic resin (D) contains a thermoplastic resin having an aromatic ring.

20. The thermoplastic resin composition (Z-2) according to claim 18, wherein the thermoplastic resin (D) contains a polyphenylene ether resin.

21. The thermoplastic resin composition (Z-2) according to claim 18, wherein the thermoplastic resin (D) contains an alkenyl aromatic resin.

22. The thermoplastic resin composition (Z-2) according to claim 18, wherein a proportion of the thermoplastic resin (X-2) is from about 0.1 to about 20% by weight, provided that the sum of the thermoplastic resin (X-2) and the thermoplastic resin (D) is assigned to be 100% by weight.

\* \* \* \* \*